United States Patent [19]

Forsstrom et al.

[11] Patent Number: 4,808,428

[45] Date of Patent: Feb. 28, 1989

[54] FLAVORED SLUSH SNACK

[75] Inventors: Stephanie L. Forsstrom, Monroe; Susan Pettigrew, Suffern, both of N.Y.

[73] Assignee: Thomas J. Lipton, Inc., Englewood Cliffs, N.J.

[21] Appl. No.: 169,857

[22] Filed: Mar. 18, 1988

[51] Int. Cl.$^4$ .............................................. A23L 2/121
[52] U.S. Cl. ..................... 426/569; 426/590; 426/415; 426/592; 426/599; 426/410; 426/393
[58] Field of Search ............... 426/569, 410, 590, 599, 426/393, 415, 592

[56] References Cited

U.S. PATENT DOCUMENTS

| 3,598,609 | 8/1971 | Hoynak | 426/590 |
|---|---|---|---|
| 3,607,307 | 9/1971 | Peyser | 426/590 |
| 3,619,205 | 11/1968 | Le Van | 426/590 |
| 3,647,472 | 3/1972 | Speech et al. | 426/590 |
| 3,826,829 | 7/1974 | Marulich | 426/590 |
| 3,826,829 | 7/1974 | Marulich | 426/590 |
| 3,897,571 | 7/1975 | Homler et al. | 426/327 |
| 3,922,361 | 11/1975 | Vann | 426/599 |
| 3,987,211 | 10/1976 | Dunn | 426/590 |
| 4,235,936 | 11/1980 | Kahn eet al. | 426/59 |
| 4,332,824 | 6/1982 | Kahn et al. | 426/590 |

Primary Examiner—Jeanette Hunter
Attorney, Agent, or Firm—Brumbaugh, Graves, Donohue & Raymond

[57] ABSTRACT

Composition adapted to form, on quiescent freezing, a flavored slush snack in the form of a homogeneous combination of large shale ice crystals, smaller ice crystals and flavored syrup, the composition having, by weight, 22-33% dextrose, 1-5% fructose, an edible acide preservative, and water. Preferred embodiments include xanthan gum, sorbitol and fruit juice. The composition is preferably packaged in a flexible container having low oxygen and water vapor transmission characteristics.

10 Claims, No Drawings

FLAVORED SLUSH SNACK

This invention relates to a flavored liquid confection which, at room temperature, has substantially the viscosity of water and which, when subjected to quiescent freezing in a home freezer provides a flavored slush snack having shale-type platelet ice crystals which is readily spoonable and pleasant to eat immediately after being taken from the freezer and which maintains its pleasant eating characteristics over at least approximately 15-30 minutes of standing at room temperature after removal from the freezer. The invention also relates to the combination of the flavored liquid confection and a flexible package.

BACKGROUND OF THE INVENTION

Flavored slush snacks enjoy a high level of acceptance, particularly by children in the six to twelve year old age group. These confections are commonly available for consumption at or near the place of production, and are prepared by a scraped-surface freezer, similar to those used for making soft ice cream. The flavored slush snacks are served at or near the freezing point of water and are composed of a sweetened and flavored aqueous liquid containing a substantial quantity of fine ice crystals. They are commonly prepared on a continuous basis with constant agitation during freezing. It is generally impractical to prepare such compositions in the home because of the specialized equipment required. As a further disadvantage, it is noted that once products of this nature made with scraped surface freezers are melted, re-freezing of the product provides an undesirable product which is essentially a block of ice.

Several recent attempts to provide slush snacks that can be prepared or stored in a home freezer are found in the patent literature. U.S. Pat. No. 3,826,829 to Marullick describes a liquid suitable for producing a slush beverage which utilizes a composition containing water, sugars, polyols, flavor, and coloring agents together with pectin in combination with other gums as a stabilizing agent. The product of this invention, which can include both carbonated and non-carbonated aqueous solutions as a base, has for an object the provision of a product having a sherbet-like consistency. This fine grained ice crystal structure is a disadvantage where products containing "shale" ice crystals are desired. In addition, the pectin imparts an unpleasant, somewhat slimy characteristic to the beverage when the product has melted and also contributes to haziness in the product, which can be unacceptable for purposes where clarity is desired.

U.S. Pat. No. 3,897,571 to Homler et al. describes a process for producing a refrigeration-stable slushed comestible concentrate that is spoonable and stirrable at 0° F., and which remains in this desirable condition over an extended period of storage at home freezer temperatures, without hardening into an unspoonable block. The process includes the steps of slowly growing ice crystals in a composition containing gum and sugar and continuing the crystallization process while agitating to produce an overrun and to incorporate a gaseous phase to establish a stable tertiary phase mixture of concentrated syrup matrix interspersed with coarse ice crystals in a gaseous foam. A product of this type has the disadvantage of requiring distribution and storage only under home freezer temperatures. In addition, it does not retain its desirable characteristics through a thaw-refreeze cycle.

U.S. Pat. No. 3,647,472 to Speech et al. describes a beverage mix which can be stored at room temperature for an indefinite period of time but which is intended to be placed in a home freezer to be allowed to freeze to a slush consistency before it is consumed. The beverage mix is intended to be combined with an alcoholic distillate or other liquid ingredient before consumption. The composition contains sugar in quantities up to 30-40% by weight, which serves as both a sweetener and as a cryoscopic modifier. Glycerol is also used as a cryoscopic modifier, for the purpose of controlling the size of the ice crystals and the freezing point of the mix.

One disadvantage of the Speech et al. product is the requirement that it be mixed with another liquid, such as an alcoholic distillate or other beverage, before consumption. In addition, the patented product contains glycerol at a level of 0.5 to 8% to control the size of the ice crystals formed during freezing. It has been found that glycerol contributes an undesirable bitter flavor to the product.

U.S. Pat. No. 3,922,361 to Vann describes a process for preparing a soft frozen, all natural fruit juice in which a fruit juice concentrate, such as orange, is thawed and combined with natural sweeteners and subjected to freezing in a slush freezing apparatus.

A number of problems are encountered in preparing a flavored liquid snack product which is intended to be marketed in containers stored at room temperature for subsequent use by the household by placing the container in a home freezer. The first problem is one of sweetness regulation. In most compositions of this nature, the presence of a high level of sugar is desired to modify the extent and type of ice crystal formation sufficiently to permit the realization of a slush rather than a solid frozen product. Slush is defined as a mixture of liquid and ice crystals. Thus, the selection of a suitable sugar or combination of sugars which will supply the desired ice crystal modification effect and freezing point depression and at the same time not be unbearably sweet to the taste is important.

A second and related problem is that of crystallization of dextrose or other sugars used in preparing these products. Because of the concentration effect which takes place on freezing of liquids of this nature, sugars such as dextrose reach a point where they are in supersaturated solution, whereupon crystallization of the sugar takes place. The crystals do not readily re-dissolve on thawing of the product. The presence of crystallized dextrose and other sugars is decidedly a disadvantage in slush snacks in that the white crystals provide an unattractive, undesirable, appearance to the frozen product. This problem of crystallization is accentuated where repeated freeze-thaw cycles are encountered.

Another important consideration is the shelf stability of the liquid product at room temperature. Liquids having a high sugar content are ideal places for microorganisms such as yeast to grow. It is thus important that microbiological stability is insured by using the correct balance of sugar concentration, acidity and added preservatives such as the sorbates and benzoates.

Still another important consideration is the nature of the final product. It is desirable to provide a product which has a substantial proportion of platelet ice crystals, termed "shale" ice, intermixed with liquid and fine ice crystals to form a homogenous mass. This homogenous mass must form during quiescent freezing of the product in the container. At the same time, the frozen product must be easily disrupted by stirring or by pressure exerted by deforming a flexible container.

Another important consideration is that the consistency of the slush product remain substantially unchanged over a prolonged period of storage at freezer temperatures. Home freezer temperatures vary from +10° F. to −10° F. and the product must be formulated so that the product is readily stirred to a slush with a spoon after two to three months storage at −10° F.

Still another important consideration is the character of the slush snack after removal from the freezer and during consumption. It is highly desirable that immediately upon removal from the freezer, the product can be simply stirred with a spoon to break it up into a slush which is readily consumable with a spoon. During melting of this slush, which should take place over a period of about 15–30 minutes at room temperature, desirable slush characteristics should be maintained. The completely melted product should also be suitable for drinking, should be free from gummy or slimy characteristics and should have a consistency approaching that of water.

SUMMARY OF THE INVENTION

It has now been found that a flavored slush snack can be prepared which, when placed in a container and hermetically sealed, will be stable at room temperature for a prolonged period of storage and which upon being placed in a home freezer will freeze within eight hours to provide a flavored slush snack of the highly desirable characteristics set forth above without the disadvantages found in prior art compositions. The frozen composition of the present invention has a combination of shale ice crystals, smaller ice crystals and concentrated syrup which appear homogeneously throughout the mass when the beverage is frozen without stirring. It is believed that many of the crystals incorporate varying amounts of the soluble solids during the freezing process. This frozen product is easily broken up with a spoon even at temperatures as low as −10° F. In addition, the product retains desirable characteristics including a uniform slushy consistency for at least 30 minutes following removal from the freezer.

The highly desirable results are obtained by providing a composition comprising from 22 to 33% by weight of dextrose, from 1 to 5% by weight of fructose, preferably supplied by high fructose corn syrup, and preservatives, the total soluble solids of the composition being in the range of 25 to 35%, by weight. The range of soluble solids specified insures that the composition will have the correct texture at freezer temperatures. Where the slush snack is based upon a fruit juice content and flavor, the composition contains an edible acid selected from the group consisting of citric, malic, tartaric, lactic and fumaric acids at a level to provide a pH in the product of about 2.5 to 2.8, and from 5 to 25% of a fruit juice, and preservatives. Where the snack flavor is one which is customarily at a higher pH, a suitable food acid is used where necessary. In the case of a coffee or chocolate flavored product, a pH of about 4.0–4.5 should be achieved; a tea flavored product should have a pH of 2.5–4.5, depending upon whether it also contains a lemon flavor; and a cola flavored product would have a pH of 2.0 to 3.0. It is preferred in all compositions of this invention to include xanthan gum, at a level of from 0.05 to 0.10%, and sorbitol, at a level in the range of 1.0 to 3.0%.

In a most preferred embodiment, the flavored slush snack of this invention comprises by weight about 25% dextrose, about 4.0–4.5% high fructose corn syrup, about 2% sorbitol, about 0.08% xanthan gum, about 0.5% citric acid, 0.15–0.3% ascorbic acid, 10% fruit juice, flavor, color and the balance water.

In accordance with one further aspect of the present invention, the composition described above is packaged in a flexible thermoformed plastic cup, preferably one made of polypropylene and having a moisture and oxygen barrier which prevents entry of oxygen into the container and which prevents loss of water vapor through the container under normal room storage and freezer storage conditions. Preferably, a 7.85 fluid ounce cup container is used that has a water vapor permeability factor no greater than 0.003 gm per container per 24 hours at 100° F. and 90% relative humidity and an $O_2$ permeability no greater than 0.004 cc per container per 24 hours at 73° F., 1 atmosphere and 100% relative humidity.

DETAILED DESCRIPTION OF THE INVENTION

The fruit juice used in the flavored slush snacks of the present invention may be any natural fruit juice desired, and may be supplied either as single strength fresh or reconstituted fruit juice concentrate. The juice used should be compatible with the flavor desired, and may be cherry, pear, apple, orange, lime, lemon, grape, strawberry, raspberry, or any other desired juice of individual fruits or any desired combination thereof.

The fruit juice is preferably used at a level of 10% to supply the desired flavor and nutritional benefits of natural fruit juice to the products of the present invention. Levels as low as 5% and as high as 25% may be used to advantage, if desired. Fruit juice is advantageously supplied using 5 fold fruit juice concentrates.

The dextrose used in accordance with this invention is preferably dextrose monohydrate, a crystalline form of dextrose. However, it can also be supplied to the composition of this invention by liquid dextrose, with appropriate adjustment in water level. In any event, the composition of the present invention should contain dextrose in the approximate range of 22 to 33% by weight. Amounts in excess of this range provide a product which is excessively sweet. On the other hand, a level of dextrose below about 22% provides a product which, on freezing at home freezer temperatures, has a texture which is too hard, and is no longer spoonable at home freezer temperatures.

Fructose is supplied to the composition of the present invention as high fructose corn syrup. These are syrups derived from corn by manufacturing procedures which greatly increase their fructose levels. One high fructose corn syrup product that has been found useful is High Fructose Corn Syrup 55, a product having 55% solids, 41% of which are dextrose, 54% of which are fructose, the balance of the solids being higher sugars. Another useful product is High Fructose Corn Syrup 42, a product containing 71% solids, 42% of which is fructose.

Sorbitol is used in the beverages of the present invention to help obtain the desired texture in the frozen product. Acceptable frozen product textures were obtained using higher levels of dextrose, in the order of 35%, but such products are excessively sweet and caused problems of crystallization of the sugar during freeze-thaw cycles. Addition of sorbitol to the composition permits reduction of the dextrose to an organoleptically acceptable sweetness level, while retaining a desired spoonable texture in the frozen product. A level of 2.0% sorbitol is preferred, although good results are obtained with sorbitol at levels as low as 1.0%. Levels substantially in excess of 3% provide undesirable off flavors in the product.

Edible acids employed in the product of the present invention include citric, malic, tartaric, lactic and fumaric. These acids are employed, either alone or in any desired combination consistent with the flavor of the product, to provide a finished product pH within the approximate range of 2.5 to 2.8 in the case of fruit flavored products. The preferred acids are citric or malic. It is preferred that the pH be maintained in this range, both to assist in maintaining microbiological stability and to partially mask the high sweetness level imparted by the sugars. In those products flavored with coffee, tea, chocolate, cola or other non-fruit flavors, a higher pH compatible with the flavor is used.

Xanthan gum is a preferred ingredient in the composition of the present invention, in that its presence, at levels in the range of 0.05 to 0.1%, assists in maintaining a desired texture in the frozen product, both at the time it is removed from the freezer and during the 15-30 minute period thereafter when the product is melting. The gum imparts a desired body or consistency to the thawing beverage, suspending the ice crystals in the liquid syrup, and providing a pleasing homogenous consistency to the beverage. The xanthan gum is also believed to function to assist in maintaining homogeneity of small and large ice crystal and liquid during the quiescent freezing of the product.

Other edible gums have been evaluated and have been found to be unacceptable, for various reasons. Pectins, for example, provide a product of somewhat slimy consistency, which makes a bad impression on the consumer. Similar results were achieved with mixtures of pectin and locust bean gum, as well as with carageen. While a gum is not required in the products of this invention, greatly improved characteristics are obtained in products where xanthan gum is used.

In accordance with one preferred embodiment of the invention, ascorbic acid is added at levels ranging from 0.15 to 0.30% to supplement the nutritional value of the product.

In addition to the ingredients set forth above, the beverage composition of this invention contains a low level of preservatives, such as a benzoate and a sorbate, to insure that the liquid beverage is stable against microbiological spoilage during storage at room temperature. Sodium benzoate and potassium sorbate have been employed together at levels of 0.02% and 0.04% respectively in fruit flavored products with good results, although the level and type of perservative may vary in accordance with considerations well known in the art. Higher levels of preservatives are needed where a higher product pH is needed for flavor considerations. It is also preferred that the beverage be prepared and packaged under highly sanitary conditions, and that a pasteurization step be performed before the product has been sealed in its container.

The beverage of the present invention is preferably packaged in a plastic container which has minimum permeability to water vapor and to oxygen. Low moisture permeability is needed to prevent concentration of the beverage during storage due to loss of water, with a resultant crystallization of the sugar, causing white discoloration in the product. Transmission of oxygen through the container walls, on the other hand, causes undesirable flavor changes during storage.

The container may be either a flexible freestanding cup, or a flexible walled container. One suitable container is a thermoformed polypropylene cup having a capacity of 7.8 fluid oz., having a moisture vapor transmission of 0.003 grams per container per 24 hours at 100° F. and 90% relative humidity. The cup also has an oxygen transmission of 0.004 cc per container per 24 hours at 73° F., 1 atmosphere, and 100% relative humidity.

The following are three examples of specific formulations used for preparing the slush beverage of this invention.

EXAMPLE 1

| | |
|---|---|
| Dextrose, Monohydrate | 25.00 |
| High Fructose Corn Syrup 42 | 4.23 |
| Sorbitol | 2.00 |
| Pear Juice Conc., 5-fold | 1.58 |
| Citric Acid | 0.48 |
| Apple Juice Conc., 5-fold | 0.17 |
| Natural Cherry Flavor | 0.08 |
| Xanthan Gum, Keltrol T | 0.08 |
| Ascorbic Acid | 0.03 |
| Sodium Benzoate | 0.02 |
| Potassium Sorbate | 0.02 |
| Red Color | 0.01 |
| Water | 66.30 |
| | 100.00 |

EXAMPLE 2

| | |
|---|---|
| Liquid Dextrose (69% dextrose solids) | 30.82 |
| High Fructose Corn Syrup 42 | 4.23 |
| Sorbitol | 2.00 |
| Pear Juice Conc., 5-fold | 1.58 |
| Citric Acid | 0.53 |
| Strawberry Flavor | 0.20 |
| Apple Juice Conc., 5-fold | 0.17 |
| Xanthan Gum, Keltrol T | 0.08 |
| Ascorbic Acid | 0.03 |
| Sodium Benzoate | 0.02 |
| Potassium Sorbate | 0.02 |
| Red Color | 0.01 |
| Water | 60.31 |
| | 100.00 |

EXAMPLE 3

| | |
|---|---|
| Liquid Dextrose (71% dextrose solids) | 32.57 |
| High Fructose Corn Syrup 42 | 4.23 |
| Sorbitol | 2.00 |
| Citric Acid | .43 |
| Flavor | .30 |
| Xanthan Gum, Keltrol T | .08 |
| Ascorbic Acid | .15 |
| Sodium Benzoate | .02 |
| Potassium Sorbate | .04 |
| Color | .01 |
| Water | 60.17 |
| | 100.00 |

Each of the compositions in Examples 1, 2 and 3 was prepared by heating the water to approximately 130-140° F., adding the sugars, gum, sorbitol and color thereto and carefully mixing. Finally, the ascorbic acid, juice concentrates, if used, citric acid, and preservatives are added and uniformly blended into the composition.

After the beverage was prepared, it was pasteurized by heating the product to 195° F. and then cooled to ambient temperature. The product was then asceptically packed in thermoformed cups having both moisture and oxygen barriers and having a capacity of 7.85 fluid ounces. Approximately four fluid ounces of beverage was added to each cup. The cup was then sealed using a flexible, laminated foil, heat sealable flat top.

In evaluating these products, the cup was placed in a freezer at about 0° F. and held for approximately eight hours. The product was then removed from the freezer, the side of the container flexed, the cap removed and the contents stirred. The product of each Example was found to be free of crystallized dextrose and had an attractive mixture of flake ice crystals and smaller crystals with syrup uniformly mixed throughout the product. Upon tasting, it was found to have a good balance of sweetness and acidity. After standing for 15 minutes it continued to have a large proportion of ice crystals and maintained its good taste and texture characteristics. After about 45 minutes to an hour, the ice crystals were largely melted. The remaining liquid was readily consumable as a beverage and had a consistency approaching that of water.

We claim:

1. A flavored slush snack composition consisting essentially of, by weight, 22 to 33% dextrose, 1 to 5% fructose, flavor, food acid, preservative, and the balance water, the total soluble solids of the composition being in the range of 25 to 35%, and the acid being present in an amount sufficient to provide a pH characteristic of the flavor.

2. A flavored slush snack composition consisting essentially of, by weight, 22 to 33% dextrose, 1 to 5% fructose, 0.05 to 0.1% xanthan gum, flavor, food acid, preservative, and the balance water, the total soluble solids of the composition being in the range of 25 to 35%, and the acid being present in an amount sufficient to provide a pH characteristic of the flavor.

3. The product of claim 2, wherein the flavor is a fruit flavor, the acid is selected from the group consisting of citric, malic, lactic, tartaric and fumaric, the product contains from 5 to 25%, by weight, of fruit juice, and the product has a pH of 2.4 to 2.8.

4. A composition for making a slush snack by quiescent freezing thereof comprising, by weight, about 25% dextrose, about 4% of a high fructose corn syrup having a fructose content of about 42% fructose, 2% sorbitol, 0.08% xanthan gum, about 0.5% citric acid, flavor and color, the balance being water.

5. A flavored snack product for making a slush snack by quiescent freezing comprising, in combination:
   (a) the composition of claim 1, the composition being enclose within
   (b) a sealed flexible, free standing container having a low water vapor transmission rate and a low oxygen transmission rate.

6. A flavored snack product for making a slush snack by quiescent freezing comprising, in combination:
   (a) the composition of claim 2, the composition being enclosed within
   (b) a sealed flexible freestanding container having a moisture vapor transmission rate of 0.003 grams per container per 24 hours at 100° F. and 90% relative humidity, and oxygen transmission rate of 0.004 cc per container per 24 hours at 73° F., 1 atmosphere and at 100% relative humidity.

7. A flavored snack product for making a slush snack by quiescent freezing comprising, in combination:
   (a) the composition of claim 3, the composition being enclosed within
   (b) a sealed flexible freestanding container having a moisture vapor transmission rate of 0.003 grams per container per 24 hours at 100° F. and 90% relative humidity, and oxygen transmission rate of 0.004 cc per container per 24 hours at 73° F., 1 atmosphere and at 100% relative humidity.

8. The composition of claim 1, wherein the flavor is selected from the group consisting of coffee, chocolate, cola, fruit, and tea.

9. The method of making a flavored slush snack having a homogeneous mixture of large shale-like ice crystals, smaller ice crystals and liquid syrup, the mixture being readily stirred with a spoon at temperatures as lows as −10° F., comprising the steps of placing a container of the composition of claim 1 into a freezer, and allowing the composition to quiescently freeze.

10. The method of making a flavored slush snack having a homogeneous mixture of large, shale-like ice crystals, smaller ice crystals and liquid syrup, the mixture being readily stirred with a spoon at temperatures as low as −10° F., comprising the step of placing a container of the composition of claim 2 into a freezer, allowing the composition to quiescently freeze over an approximately 8 hour period, removing the container from the freezer and stirring the contents thereof with a spoon to form the slush.

* * * * *